Figure 1:
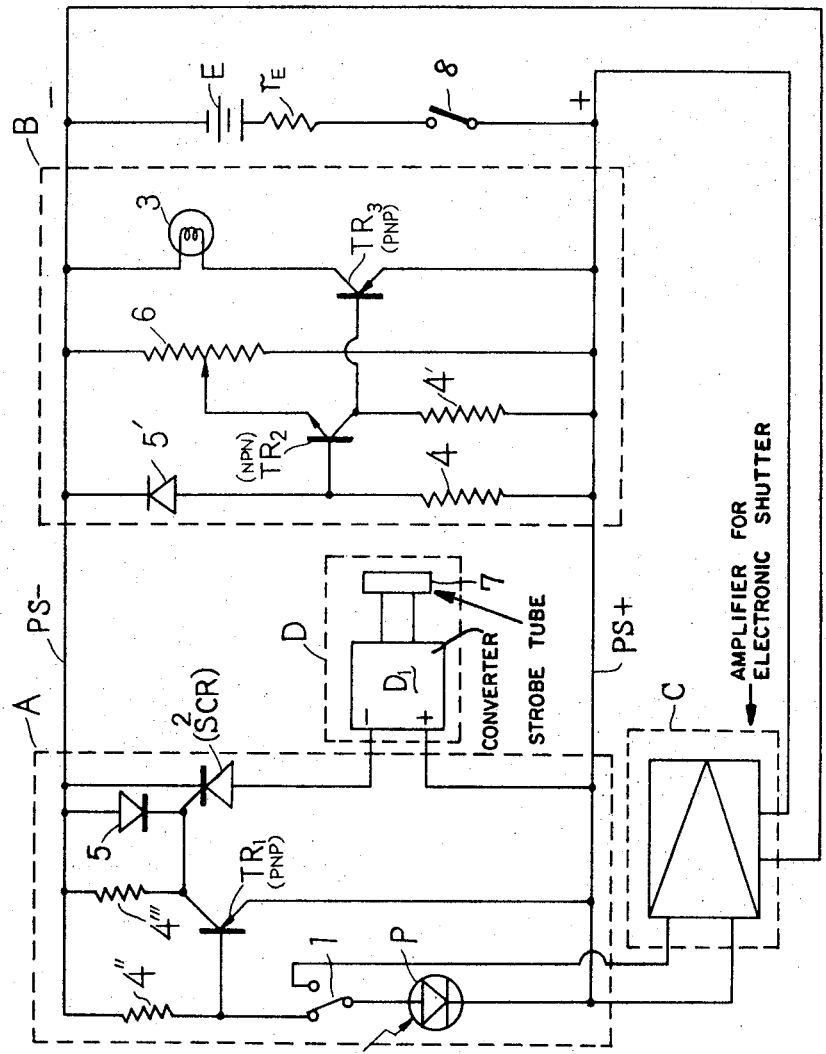

United States Patent
Uchida et al.

[15] 3,651,372
[45] Mar. 21, 1972

[54] WARNING INDICATOR APPARATUS FOR USE IN A CAMERA HAVING A FLASH DISCHARGE DEVICE CONTAINED THEREIN

[72] Inventors: Yasuo Uchida; Hideo Akimoto, both of Tokyo, Japan

[73] Assignee: Konishiroku Photo Industry Co., Ltd.

[22] Filed: Aug. 6, 1970

[21] Appl. No.: 61,673

[30] Foreign Application Priority Data

Aug. 9, 1969 Japan...................................44/62752

[52] U.S. Cl. ............................315/134, 95/11.5 R, 315/135, 315/156, 315/241 P, 315/241 S
[51] Int. Cl...................................G03b 15/05, H05b 41/30
[58] Field of Search.................315/129, 134, 135, 136, 149, 315/156, 159, 238, 241, 241 P, 241 S; 95/11.5 R

[56] References Cited

UNITED STATES PATENTS

| | | | |
|---|---|---|---|
| 3,374,718 | 3/1968 | Hochreiter | 95/11.5 R X |
| 3,526,179 | 9/1970 | Ogiso | 95/11.5 R |

Primary Examiner—Roy Lake
Assistant Examiner—Siegfried H. Grimm
Attorney—Harry C. Bierman, Jordan B. Bierman and Bierman & Bierman

[57] ABSTRACT

A warning indicator apparatus for use in an automatic exposure camera having a flash discharge device, a warning lamp and strobe flash equipment which strobe flash equipment containing a capacitor for flashing the strobe. In one embodiment the warning indicator apparatus comprises a single warning lamp lighted by means of semiconductor devices during the charging of the capacitor. In an alternative embodiment, the lamp is normally energized by a power source. Alternate shunting circuits are provided, one turning off the lamp when the photographic subject has a brightness higher than a predetermined reference value and the other turning the lamp off when the capacitor has been completely charged.

3 Claims, 2 Drawing Figures

WARNING INDICATOR APPARATUS FOR USE IN A CAMERA HAVING A FLASH DISCHARGE DEVICE CONTAINED THEREIN

The present invention relates in general to a warning indicator apparatus for use in a camera having a flash discharge device contained therein which warns the user of the camera that the shutter release button should not be depressed, and more particularly to the above-referred type of indicator apparatus which is compact in structure and operable in a reasonable manner.

Upon using a camera having a strobe equipment contained therein, it is desirable that said camera is provided with an apparatus constructed in such manner that when the brightness of the subject has become low the strobe may be automatically flashed. Furthermore, in case that the above-referred type of camera is used, when the charging of the capacitor for flashing the strobe by means of the battery contained in the camera was commenced and the preparation for the flashing is being made, the user of the camera needs to have a knowledge with respect to two points, that is, whether or not a supplementary light is necessary depending upon the brightness of the subject, and whether or not a sufficient amount of electricity for flashing has been charged in the capacitor after the charging was commenced automatically.

Heretofore, it has been a common practice that a low brightness warning lamp is lightened within a view finder when the brightness of the subject is lowered, and also the quantity of charged electricity has been indicated by lightening of a neon lamp in a strobe equipment sold in the market. Therefore, in the case of containing a strobe equipment in a camera, if the neon lamp is equipped together with the low brightness warning lamp within the view of the finder, it is convenient in use.

However, the use of two lamps within the view of the finder involves problems with respect to the cost, the places for equipment, and the like. Still further, in contrast to the fact that the low brightness warning lamp for the shutter means warning upon its lighting, the neon lamp for the strobe equipment means warning in case that it is not lighting, and thus there occurs inconsistency of indication therebetween.

One object of the present invention is to provide a novel warning indicator apparatus for use in a camera having a flash discharge device contained therein, which obviates the above-mentioned disadvantages in the prior art, and which is compact in structure and operable in a reasonable manner.

One feature of the present invention is the provision of a warning indicator apparatus for use in a camera having a flash discharge device contained therein, characterized in this that only a single indicator lamp is provided and arranged to serve both as a low brightness warning lamp and as an indicator lamp for completion of the charging in the strobe equipment so that said lamp may be turned on when the brightness of the subject is lower than the predetermined reference value and simultaneously with completion of the preparation for flashing it may be turned off. In more particular, according to the present invention, when the subject is sufficiently bright, the warning lamp provided within the view finder is not turned on indicating that the normal EE photographing is possible, while if the brightness of the subject is reduced lower than the predetermined reference value and thus strobe photographing becomes necessary, then at first the warning lamp is lightened within the view finder to indicate the fact that the charging of the capacitor in the strobe equipment has been commenced, and simultaneously with completion of the charging, that is, finish of the preparation for flashing the warning lamp is extinguished.

Another feature of the present invention is the provision of the above-featured warning indicator apparatus for use in a camera having a flash discharge device contained therein, further characterized in this that said single warning lamp is energized only during the charging period of the capacitor by making use of the voltage drop of the power source battery due to its internal resistance during the charging period of the capacitor and the non-linear V—I characteristic of a semiconductor device in combination.

Still another feature of the present invention is the provision of the first-featured warning indicator apparatus for use in a camera having a flash discharge device contained therein, further characterized in this that said single warning lamp is normally energized by the battery through a resistor but shunted by emitter-collector circuits of two separate transistors, one of which is turned on when the subject has a brightness higher than said predetermined reference value, while the other of which is turned on when said capacitor for flashing the strobe has been completely charged.

Figure 2:
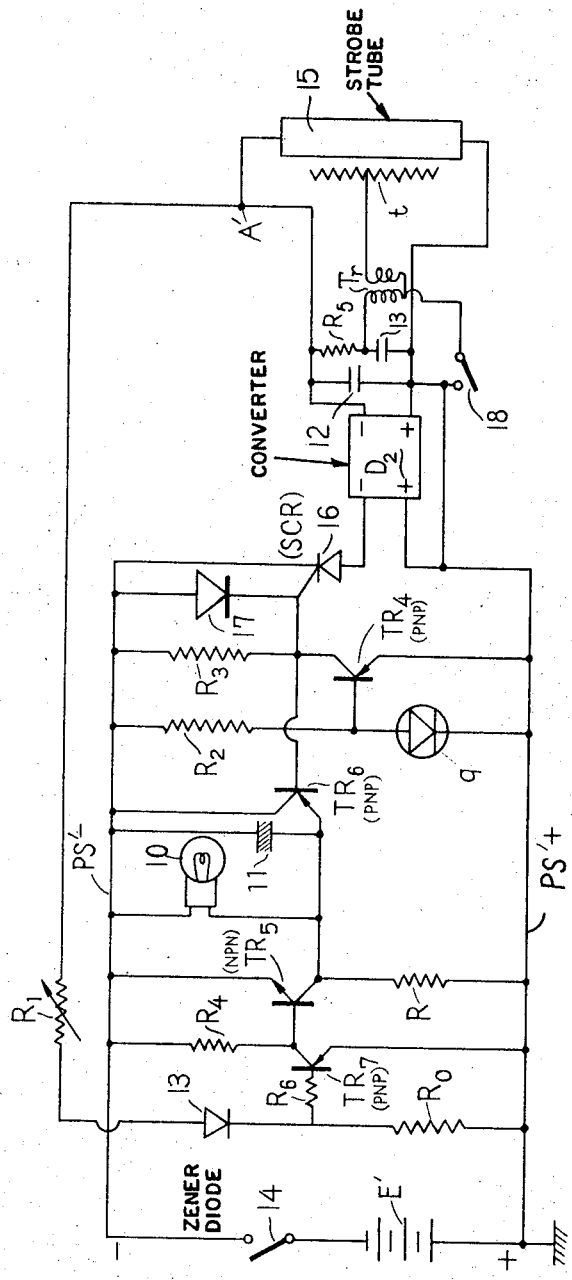

These and other objects, features and advantages of the invention will become apparent from perusal of the following specification with respect to its preferred embodiments taken in conjunction with the accompanying drawings, wherein:

FIG. 1 is a schematic circuit diagram of the warning indicator apparatus according to one preferred embodiment of the present invention, and FIG. 2 is a schematic circuit diagram of the warning indicator apparatus according to another preferred embodiment of the present invention.

Referring now to FIG. 1 of the drawings, one preferred embodiment of the present invention for achieving the above-referred object is illustrated in a schematic circuit diagram. This system makes use of the change of the terminal voltage of a battery contained in a camera due to its internal resistance during the period of charging a capacitor in a strobe equipment by means of the battery, and the non-linear V—I characteristic of a semiconductor device, in combination. In the figure, the arrangement is such that an electronic shutter is associated with a strobe equipment, that the photosensitive element of the electronic shutter is employed as a detector for automatically commencing the charging of the capacitor in the strobe equipment as soon as the subject has become darker, and that as an electric power source, a common battery is used both for the electronic shutter and for the strobe flash equipment.

In more particular, a block A encircled by a dash-line frame represents a converter control circuit section, which includes a transfer switch 1 to be operated by a shutter release button (not shown) for doubly using said photosensitive element P for charging the capacitor also for actuating the electronic shutter, a block B similarly encircled by a dashline frame represents a warning indicator lamp control section, a block C represents an electronic shutter, and a block D represents a strobe flash equipment including a converter $D_1$ and a strobe tube 7.

Describing at first with respect to the circuit section in the block A, this section is a converter control circuit, in which a base terminal of a PNP-transistor $TR_1$ is connected through break contacts of the transfer switch 1 to a positive terminal of the photo-sensitive element P that is to be inversely biased by a power source battery E through a resistor $4''$, while the emitter terminal of said PNP-transistor $TR_1$, a negative terminal of said photo-sensitive element P and a positive input terminal of the converter $D_1$ are connected to a positive power supply line PS+ that is adapted to be connected through a main switch 8 to a common power source battery E having an internal resistance $r_E$, and a collector terminal of said transistor $TR_1$ is directly connected to a gate terminal of a semiconductor controlled rectifier (hereinafter abbreviated as SCR) element 2 and also connected through a resistor $4'''$ to a negative power supply line PS— that is connected to the negative terminal of the battery E, $r_E$. An anode terminal of said SCR 2 is connected to the other input terminal of said converter $D_1$, while a cathode thereof is connected to said negative power supply line PS—. A diode 5 is connected in the inverse direction between the cathode of the SCR 2 and the negative power supply line PS— for the purpose of protecting the gate electrode of the SCR 2.

The block B is a circuit section for controlling the warning indicator lamp either to be lightened or extinguished, in which connection is made so that a current may flow from the positive power supply line PS+ through a fixed resistor 4 and a diode 5' in series in the forward direction of the latter to the negative power supply line PS−, the junction point between these elements 4 and 5' is connected to a base terminal of an NPN-transistor $TR_2$, and the emitter terminal of said NPN-transistor $TR_2$ is connected to a slide contact terminal of a potentiometer resistor 6 so that the potential applied from the junction point to the base of said NPN-transistor $TR_2$ may be lower than that applied from the slide contact of the potentiometer 6 to the emitter of said NPN-transistor $TR_2$. On the other hand, the collector terminal of said NPN-transistor $TR_2$ is connected directly to a base terminal of a PNP-transistor $TR_3$ and also through a fixed resistor 4' to the positive power supply line PS+, the emitter terminal of said PNP-transistor $TR_3$ being connected to the positive power supply line PS+, and an indicator lamp 3 is connected between the collector terminal of said PNP-transistor $TR_3$ and the negative power supply line PS−.

The block C is an amplifier for an electronic shutter, and illustrated as connected to the power supply lines PS+ and PS− and to the photo-sensitive element P in the block A, but the electronic shutter as well as the output connection of the amplifier leading to said electronic shutter are omitted from illustration. The block D is a strobe flash equipment which consists of a DC—DC converter $D_1$ and a strobe discharge tube 7 interconnected with each other through a X-contact (not shown) of the camera. The main switch 8 of the warning indicator apparatus is adapted to be closed at the first step of the depression of the shutter release button.

Describing now the sequence of operations of the embodiment illustrated in FIG. 1 as constructed in the above-mentioned manner, at first the main switch 8 is closed by the actuation of the shutter release button. When the photo-sensitive element P is directed to a bright subject, the impedance through the photo-sensitive element P is so small that the base current of the PNP-transistor $TR_1$ is blocked due to the too high potential at the base of the PNP-transistor $TR_1$, and therefore, the emitter-collector circuit of said transistor $TR_1$ is not conducting. Accordingly, the SCR 2 is not actuated, and thereby the block D including the converter $D_1$ also cannot operate. Then, if the shutter release button of the camera is further depressed, the switch 1 is transferred so that the photo-sensitive element P may be coupled to the electronic shutter through the make contacts of the switch 1 and the amplifier in the block C, and thus an appropriate exposure is achieved by the automatic exposure device.

However, when the brightness of the subject is reduced lower than a predetermined limit value, the base potential of the PNP-transistor $TR_1$ becomes more negative than the emitter potential of the same due to the increased impedance of the photo-sensitive element P, and thereby the transistor $TR_1$ becomes conducting. Then a positive potential at the gate electrode of the SCR 2 is generated by the voltage drop across the resistor 4''', and thereby the SCR 2 becomes conducting. Therefore, the DC—DC converter $D_1$ for the strobe tube 7 in the block D is actuated by the application of the power source voltage across its input terminals, resulting in commencement of charging of the capacitor (not shown) for the strobe flash tube.

Now the operation of the warning indicator apparatus according to the present invention in the aforementioned case, will be described.

In the block B, a current flows from the positive terminal of the power source battery E, $r_E$ through the closed main switch 8, the positive power supply line PS+ the series connection of the fixed resistor 4 and the diode 5, and the negative power supply line PS− to the negative terminal of the battery in the forward direction of the diode 5', and accordingly, a voltage drop is produced across the diode 5'. Therefore, the base of the NPN-transistor $TR_2$ is at a positive potential equal to the voltage drop across the diode 5' with respect to the potential at the negative terminal of the battery E, $r_E$. On the other hand, the emitter of the NPN-transistor $TR_2$ is applied with a potential between the potentials of the positive and negative terminals of the power source battery E, $r_E$, which is determined by the position of the slide contact on the potentiometer resistor 6. Accordingly, when the battery E, $r_E$ has its normal undropped terminal voltage, if the slide contact on the potentiometer 6 is adjusted so that the potential at the emitter of the transistor $TR_2$ is higher than the potential at the base of the same transistor, that is, at the junction between the diode 5' and the fixed resistor 4, then at the state of a normal terminal voltage of the battery E, $r_E$, i.e., at the state that the subject is so bright that the charging is not carried out in the strobe equipment, the collector-emitter circuit of the NPN-transistor $TR_2$ is non-conducting through the fixed resistor 4', resulting in rise of the potential at the collector of the NPN-transistor $TR_2$, that is, at the base of the PNP-transistor $TR_3$, which makes the PNP-transistor $TR_3$ also non-conducting, and consequently, the pilot lamp 3 connected between the collector of said PNP-transistor $TR_3$ and the negative power supply line PS− cannot be lightened.

However, as described previously in connection to the operation of the block A, if the charging of the capacitor for flashing the strobe is commenced due to the insufficient brightness of the subject, then a relatively heavy current of the order of several amperes is supplied from the power source battery E, $r_E$ as the charging current, so that the terminal voltage of the battery is lowered due to its internal resistance $r_E$ in the case of the conventional batteries. As a result, both the potentials at the junction between the diode 5' and the fixed resistor 4 and at the slide contact on the potentiometer resistor 6 are lowered simultaneously. However, here it is to be noted that the semiconductor diode 5' has a well-known non-linear V—I characteristic and the effective resistance V/I at a given value of V is increased as the value of the voltage V is lowered within a certain range. Therefore, the potential at the junction between the diode 5' and the fixed resistor 4, that is, at the base of the NPN-transistor $TR_2$ is lowered more slowly than it is lowered in proportion to the reduction of the terminal voltage across the power source battery E, $r_E$. On the other hand, the potential at the slide contact of the potentiometer resistor 6 is lowered simply in proportion to the reduction of the terminal voltage of the battery E, $r_E$. Thus the potential of the base of the NPN-transistor $TR_2$ is lowered less than that of the emitter of said transistor $TR_2$, so that the transistor $TR_2$ becomes conducting and the potential at the collector of the same is lowered. Since the potential at the base of the PNP-transistor $TR_3$ which is directly connected to the collector of the NPN-transistor $TR_2$ is lowered, the PNP-transistor $TR_3$ also becomes conducting to feed a current to the indicator or pilot lamp 3, and thereby the lamp 3 is lightened.

In this case, the lightening of the lamp 3 indicates the facts that the brightness of the subject is too low to take a photograph as per the automatic exposure without a strobe flash, and that in the circuit of the strobe flash equipment, the charging is automatically being carried out. When the charging of the capacitor for flashing the strobe tube has been completed, the terminal voltage of the power source battery E, $r_E$ substantially returns to its normal voltage, so that the NPN-transistor $TR_2$ again becomes non-conducting and the PNP-transistor $TR_3$ also becomes non-conducting to extinguish the pilot lamp 3. At this moment, the extinguishment of the lamp implied that a sufficient amount of electricity for flashing the strobe tube has been charged in the capacitor for flashing. Now if the user further depresses the shutter release button, then the switch 1 is transferred to close its make contacts leading to the amplifier for the electronic shutter so as to control the shutter, and also the X-contacts (not shown) contained in the block D is closed to flash the strobe tube 7. In case that the voltage of the battery in use is subjected to drift and/or fluctuation, the voltage level of the battery E, $r_E$ where the pilot lamp 3 is extinguished may be adjusted by means of the variable voltage divider, that is, the potentiometer resistor 6.

In an alternative embodiment of the present invention, the completion of the charging may be detected by the rise of the terminal voltage across the capacitor for flashing the strobe tube. This second embodiment will be described hereinafter with reference to FIG. 2.

A photo-sensitive element 9 for measuring the brightness of the subject is provided having its negative terminal connected to a positive power supply line PS′+ leading to the positive terminal of a power source battery E′ and its positive terminal connected through a resistor $R_2$ to a negative power supply line PS′— which is in turn connected to the negative terminal of the battery E′ via a main switch 14, so that the photo-sensitive semiconductor element 9 may be applied with an inverse bias voltage as is well-known in the art. The junction between the resistor $R_2$ and the photo-sensitive element 9 is directly connected to a base of a PNP-transistor $TR_4$, the emitter of which is directly connected to a positive power supply line PS′+ which is in turn connected to the positive terminal of the battery E′ and the ground. The collector of said PNP-transistor $TR_4$ is directly connected to a gate electrode of a SCR 16 and also connected through a resistor $R_3$ to the negative power supply line PS′—. The anode of said SCR 16 is connected to a negative input terminal of a DC—DC converter $D_2$, while the cathode thereof is connected to the negative power supply line PS′—. The positive input terminal of said DC—DC converter $D_2$ is connected to the positive power supply line PS′+ and also directly coupled to the positive output terminal of said DC—DC converter $D_2$. A diode 17 is connected in the inverse direction between the cathode of the SCR 16 and the negative power supply line PS′— for the purpose of protecting the gate electrode of the SCR 16.

Across the output terminals of the DC—DC converter $D_2$ is connected a capacitor 12 for storing a sufficient electric energy to flash a strobe tube 15, the main discharge electrodes of which are connected to the positive and negative output terminals, respectively, of the DC—DC converter $D_2$. A series connection consisting of a resistor $R_5$ and a capacitor B is connected across the capacitor 12 with the free end terminal of the capacitor 13 connected to the positive output terminal of the DC—DC converter $D_2$. The capacitor 13 is adapted to be discharged through a circuit consisting of a primary winding of a step-up transformer $T_r$ and X-contacts 18 which may be closed in synchronism with the operation of the camera shutter. One end of the secondary winding of the step-up transformer $T_r$ is connected to the end of the primary winding of the same connected to the contact 18, while the other end of the secondary winding is connected to a trigger electrode $t$ of the strobe flash tube 15.

A warning indicator lamp 10, which serves to warn the user of the facts that the brightness of the subject is insufficient but the capacitor 12 for flashing the automatically operable strobe tube 15 has not been charged completely, is connected at one terminal directly to the negative power supply line PS′— and at the other terminal through a resistor R to the positive power supply line PS′+. A capacitor 11 having a large capacity is connected in parallel to the lamp 10 for the purpose of stabilization in brightness of said lamp 10 as fully described later.

However, this warning indicator lamp 10 is shunted by two separate collector-emitter circuits of an NPN-transistor $TR_5$ and a PNP-transistor $TR_6$, respectively, and it is normally short-circuited by a conducting collector-emitter circuit of either one of the transistors $TR_5$ and $TR_6$. More particularly, the emitter of the NPN-transistor $TR_5$ and the collector of the PNP-transistor $TR_6$ are connected to the negative power supply line PS′—, while the collector of the NPN-transistor $TR_5$ and the emitter of the PNP-transistor $TR_6$ are connected to the junction between the lamp 10 and the resistor R. The base of the PNP-transistor $TR_6$ is directly connected to the collector of the PNP-transistor $TR_4$. The base of the NPN-transistor $TR_5$ is directly connected to a collector of a PNP-transistor $TR_7$ and also connected through a resistor $R_4$ to the negative power supply line PS′—. The emitter of the PNP-transistor $TR_7$ is directly connected to the positive power supply line PS′+. The junction point A′ between the negative main electrode of the strobe tube 15 and the negative output terminal of the DC—DC converter $D_2$ is connected through a variable resistor $R_1$, an inversely biased Zener diode 13 and a resistor $R_0$ to the positive power supply line PS′+. The junction between the Zener diode 13 and the resistor $R_0$ is connected through a resistor $R_6$ to the base of the PNP-transistor $TR_7$.

Now the operation of the second embodiment of the present invention as described above will be explained hereinafter.

When the subject has a sufficient brightness for taking its photograph, since the impedance of the photo-sensitive element 9 is low, the base potential of the PNP-transistor $TR_4$ is raised, and thus because of non-existence of the forward voltage across the base-emitter circuit of the transistor $TR_4$, said transistor is turned off. Accordingly, little voltage drop is produced across the resistor $R_3$, and thereby the potential at the collector of the PNP-transistor $TR_4$ and the gate electrode of the SCR 16 directly coupled to each other is maintained substantially at the potential of the negative power supply line PS′—. Therefore, said SCR 16 is blocked, so that a current cannot be passed from the power source battery E′ to the DC—DC converter $D_2$ and thus the charging of the capacitor 12 for discharging the strobe flash tube 15 cannot be carried out. However, since the emitter-base circuit of the PNP-transistor $TR_6$ is forwardly biased, said transistor is turned on, and its emitter-collector circuit serves to short-circuit the warning indicator lamp 10. Therefore, the current to be fed to said lamp 10 from the power source battery E′ through the resistor R is by-passed by the conducting emitter-collector circuit of the PNP-transistor $TR_6$, so that the warning indicator lamp 10 cannot be lightened, indicating the fact that the brightness of the subject is sufficiently high to take a photograph as per the EE exposure system and the user may further depress the shutter release button. On the other hand, since the DC—DC converter $D_2$ is not actuated and the capacitor 12 connected across the output terminals of said converter $D_2$ and having its positive electrode is directly connected to the grounded positive power supply line PS′+ is not charged up, the junction point A′ between the strobe tube 15 and the capacitor negative electrode is maintained substantially at the same potential as the positive power supply line PS′+ of the power source battery E′. Therefore, the junction point between the Zener diode 13 and the resistor $R_0$ is also kept at the same potential, which makes the PNP-transistor $TR_7$ non-conducting, and the resulted lower potential at the collector of the same transistor $TR_7$ directly coupled to the base of the NPN-transistor $TR_5$ makes the latter transistor $TR_5$ also non-conducting. Therefore, in this case, the collector-emitter circuit of the transistor $TR_5$ shunted across the warning indicator lamp 10 does not have a short-circuiting effect upon the lamp 10.

However, if the brightness of the subject becomes so insufficient as to require a flashing equipment, then due to rise of the impedance through the photo-sensitive element 9, the base potential of the PNP-transistor $TR_4$ is lowered, and said transistor $TR_4$ is turned on. Terefore, a positive voltage at the gate electrode of the SCR 16 is generated by the emitter-collector current of said transistor $TR_4$ passing through the resistor $R_3$, and thereby said SCR 16 becomes conducting to commence the operation of the DC—DC converter $D_2$. Simultaneously therewith, the positive potential applied to the base of the PNP-transistor $TR_6$ which is directly connected to the gate electrode of the SCR 16, causes said PNP-transistor to turn off, and thus the pilot or indicator lamp 10 is fed with a current and is lightened because the short-circuit across the lamp 10 is removed.

As described above, since the capacitor 12 for flashing the strobe tube 15 begins to be charged up by the operation of the DC—DC converter $D_1$, the voltage across the capacitor 12 is raised continuously and the potential at the point A′ becomes more negative with respect to the ground. Then, during the initial period of charging, that is, during the period when the potential at the point A′ is too small in magnitude to bring the Zener diode 13 into its conducting state, the PNP-transistor $TR_7$ is non-conducting as a forward voltage is not applied across its emitter-base circuit, and accordingly the NPN-transistor $TR_5$ is also non-conducting similarly to the case of the sufficiently bright subject as explained previously.

However, when the capacitor 12 has been charged completely and the voltage across the capacitor exceeds a predetermined value, the relatively large negative potential at the point A' causes the Zener diode 13 to conduct with a very low backward impedance, so that the potential at the junction between the Zener diode 13 and the resistor $R_0$ is determined by the potential at A' and the resistance values of the adjustable resistor $R_1$ and the fixed resistor $R_0$. This negative junction potential is applied through a self-bias resistor $R_6$ to the base of the PNP-transistor $TR_7$ so as to apply it a forward emitter-base bias voltage. Thus the PNP-transistor $TR_7$ is turned on, and due to the rise of its collector potential produced by the voltage drop across the resistor $R_4$, the NPN-transistor $TR_5$ is also positively biased across its base-emitter circuit, and the collector-emitter circuit of said NPN-transistor $TR_5$ effectively short-circuits the pilot or indicator lamp 10. Therefore, a current flows from the positive power supply line PS'+ through the resistor R and the collector-emitter circuit of the transistor $TR_5$ to the negative power supply line PS'− without flowing through the lamp 10, and accordingly the pilot or indicator lamp 10 is extinguished. The extinguishment of the lamp 10 at this moment implies that the charging of the capacitor 12 has been completed and that flash photographing by making use of the strobe discharge tube 15 has become possible.

The capacitor 11 in this circuit serves to prevent the pilot or indicator lamp 10 from being lowered in brightness because of the transient voltage drop across the power source battery E' caused by the transient having charging current of the capacitor 12 via the DC—DC converter $D_2$. In more particular, when the voltage across the power source battery E' is transiently lowered, the decrease of the power source voltage appears entirely across the resistor R because of the existence of the relatively large capacitor 11, and the terminal voltage across the lamp 10 is kept substantially unchanged about for a time determined by the time constant calculated by the resistance of the lamp 10 and the capacitance of the capacitor 11, which is selected longer than the time constant of the transient charging period of the capacitor 12. Therefore, the brightness of the pilot or indicator lamp 10 is not affected or not lowered by the transient voltage drop of the power source battery E' in the initial period of its lightening. In summary, it is to be noted that the emitter-collector circuit of the PNP-transistor $TR_6$ serves to short circuit the indicator lamp 10 when the subject to be photographed is sufficiently bright, while the collector-emitter circuit of the NPN-transistor $TR_5$ serves to short circuit the indicator lamp 10 when the capacitor 12 in the strobe flash equipment has been completely charged and is ready to flash the strobe tube 15.

When the user of the camera is noticed that the strobe flash equipment is ready to flash the flash tube 15, by the extinguishment of the warning indicator lamp 10, he will further depress the shutter release button to actuate the automatic exposure shutter mechanism. Then in synchronism with the operation of the camera shutter, X-contacts 18 are closed to complete a discharge loop for the capacitor 13. The discharge current from the charged capacitor 13 through the primary winding of the step up transistor $T_r$ produces a relatively high impulsive voltage such as of 3–5 kv. across its secondary winding, and this high impulsive voltage is applied to the trigger electrode $t$ of he strobe flash tube 15 with respect to the ground potential applied to one of the main discharge electrodes. Consequently, most the charge stored in the capacitor 12 is discharged through the strobe flash tube 15 for flashing said tube. The resistor $R_5$ prevents the charge on the capacitor 12 from being discharged through the X-contacts 18.

As described in detail with respect to the two preferred embodiments above, according to the present invention, the low brightness warning lamp of an automatic exposure shutter and the warning lamp for indicating incompletion of the charging in the strobe flash device are united into a single lamp, which is lightened when the subject is so dark that a flash light is necessitated, and which is extinguished at the moment when the strobe equipment has become ready to flash. In other words, under the brightness which disables the conventional automatic exposure photographing, the warning lamp is lightened, and then extinguished simultaneously with completion of the charging in the strobe equipment contained in the camera. Therefore, the user of the camera is noticed by the lighting lamp during the charging in the strobe equipment that the flash photographing is impossible, whereas so far as the lamp is not lightened, he is noticed that the photographing is possible regardless of whether under a natural light or under a flash light. Accordingly, the present invention provides an advantage that the photographing can be achieved according to quite reasonable instructions.

While the present invention has been described above in connection to its specific embodiments, it is to be understood that the invention should not be limited only to those embodiments but many changes and modifications thereof could be made within the scope of the invention without departing from the spirit of the invention.

What is claimed is:

1. A warning indicator apparatus for use in a camera having a flash discharge device contained therein, said camera being an automatic exposure type of camera constructed in such manner that a warning lamp and a strobe flash equipment are contained therein and a capacitor for flashing the strobe may be automatically charged when the subject has a brightness lower than a predetermined reference value; characterized in that said warning indicator apparatus comprises only a single warning lamp coupled to said strobe flash equipment by means of a number of semiconductor devices so that said warning lamp may be lightened only during the charging period of the capacitor for flashing the strobe while said lamp may be extinguished simultaneously with completion of the charging of said capacitor.

2. A warning indicator apparatus for use in a camera having a flash discharge device contained therein as claimed in claim 1; further characterized in that said single warning lamp is energized only during the charging period of the capacitor, by making use of a voltage drop of a power source battery due to its internal resistance during the charging period of the capacitor and a non-linear V—I characteristic of a semiconductor device in combination.

3. A warning indicator apparatus for use in a camera having a flash discharge device contained therein as claimed in claim 1; further characterized in that said single warning lamp is normally energized by a power source battery through a resistor but shunted by emitter-collector circuits of two separate transistors, one of which is turned on when the subject has a brightness higher than said predetermined reference value, while the other of which is turned on when said capacitor for flashing the strobe has been completely charged.

* * * * *